Sept. 15, 1970          B. L. GAECKEL          3,528,458

TUBULAR INSULATION FORMED BY AN EXTRUSION PROCESS

Filed Nov. 13, 1968

INVENTOR.
BRUNO L. GAECKEL
BY William G. Hofley

United States Patent Office 3,528,458
Patented Sept. 15, 1970

3,528,458
TUBULAR INSULATION FORMED BY AN EXTRUSION PROCESS
Bruno Lothar Gaeckel, Westmount, Quebec, Canada, assignor to Union Carbide Canada Limited, Toronto, Ontario, Canada, a company of Canada
Filed Nov. 13, 1968, Ser. No. 775,245
Int. Cl. F16l 9/14
U.S. Cl. 138—143                                   7 Claims

ABSTRACT OF THE DISCLOSURE

A thermally insulated tubing is produced by extruding an insulating material on a metal tube. The material consists of an expanded cellular thermoplastic material uniformly impregnated with asbestos fibers.

---

This invention relates to the thermal insulation of pipe. More particularly it relates to a metal pipe having a thermal insulation extruded thereon.

The insulating of pipe by means of thermal insulation such as that consisting essentially of asbestos is well known. For example, molded sections of asbestos are wrapped around metal pipe and are held in place by a fabric coating and secured by means of plaster and metal clamps.

While such known means of insulating pipes are effective, they have several disadvantages. For example, pipes coated with asbestos molding require frequent repair unless the molding is carefully secured to the pipe by skilled craftsmen. Pipes having molded insulation are also subject to loosening and cracking when the pipe is bent or flexed to any considerable extent or when it is subjected to impact. Furthermore when such pipes are located in an area of limited access, the replacement of such molded insulation becomes very difficult.

It is therefore an object of this invention to provide a thermally insulated pipe having improved flexibility.

It is another object of this invention to provide a thermally insulated pipe having improved impact strength.

It is a further object of the invention to provide a thermally insulated pipe which is relatively easy to install.

The present invention provides a metal pipe having a thermal insulation extruded thereon, said insulation comprising cellular thermoplastic material impregnated with asbestos fibers. By providing lengths of pipe complete with an insulation composition such as described below, insulated pipes can be connected at the construction site by simply joining completed pipe sections.

It can also be appreciated that such pipes can conveniently replace sections of insulated piping which are located in areas which are difficult to reach. For example, under present construction practices pipes which require thermal insulation are usually covered with sections of asbestos molding before the inner panels for the wall are installed. Since the fitting of the asbestos molding requires adjustments and fittings at numerous points along the pipe length, virtually the entire length of pipe must be accessible to the craftsman in order to fit the mold. When such a pipe section section has to be replaced after construction is completed due to pipe leakage or other reasons, a considerable section of wall would have to be removed.

Under modern methods of builds construction non-insulated pipes which are located between wall sections can be removed by unscrewing the particular section of pipe and lowering or raising it through a passage between the floors and then out through a small panel in the room below or above. Because of the method of sectional molding of thermal insulation as described above, it can be appreciated that thermally insulated piping most commonly used at the present time could not take advantage of this convenience in modern building design. However, by providing lengths of thermally insulated pipe which has sufficient flexibility and impact strength to be handled by construction and repair crews without damage, a single length of thermally insulated pipe can be replaced by lowering or raising the pipe length through floor passages as explained above, and a replacement pipe of the present invention can be raised or lowered through the same passage and fitted in its place. The ends of the pipe of the present invention may be free of insulation so that pipe sections may be jointed by couplings or other means.

The thermal insulating material which was found to be satisfactory both as to insulation characteristics and extrudability onto a pipe as well as having the desirable flexibility and impact strength characteristics, is a cellular thermoplastic material uniformly impregnated with asbestos fibers. It was found advisable to include a blowing agent in the thermoplastic so that the extruded insulation has cellular characteristics and thus contains air pockets which greatly enhance its insulating properties. The asbestos acts as a reinforcing agent and filler and contributes as well to the insulating properties of the material. Various blowing agents known in the art can be used, for example those sold under the trade name Celogen Ot, Celogen AZ, and Kempore 125. For best results such agents are present in an amount from 0.5 to 2% by weight of total material.

The thermoplastic which may be used includes various well known thermoplastic resins such as polyethylene, polypropylene and various copolymers of those resins such as ethylene/vinyl acetate. While the preferred concentration of asbestos will depend upon the extrusion characteristics of the particular thermoplastic resin and whether pigments or fillers are included in the insulating material, good insulating and extrusion properties were obtained using insulating material having a density of from 0.400 to 0.800 gm./cc. With this in view, it was found that material having from 20% to 90% by weight of asbestos based on the total weight of the insulating material gave good results with the best results depending upon the type of polymer used. For example, higher loading of asbestos is possible with ethylene/vinyl acetate copolymers than with polyethylene. When using ethylene/vinyl acetate copolymers, mixtures containing from 30% up to 90% asbestos gave the best results. In the case of polyethylene, mixtures containing from 20% to 70% asbestos gave the best results. Material containing more than 90 percent asbestos becomes difficult to extrude onto a pipe.

A preferred insulating material consists of cellular ethylene/vinyl acetate copolymer having a melt index above 200 g./10 min. and having from about 30 percent to 70 percent by weight asbestos fibers and containing a blowing agent in an amount of from 0.5 percent to 2.0 percent by weight of said copolymer.

In one embodiment a pigment is included in the material to be extruded. This avoids the necessity of painting the insulated pipe after insulation should such decorative effect be deemed necessary.

An example of a thermally insulated pipe of the present invention and a method of extruding the insulation onto the pipe are described below with reference to the drawing in which.

Figure 1:
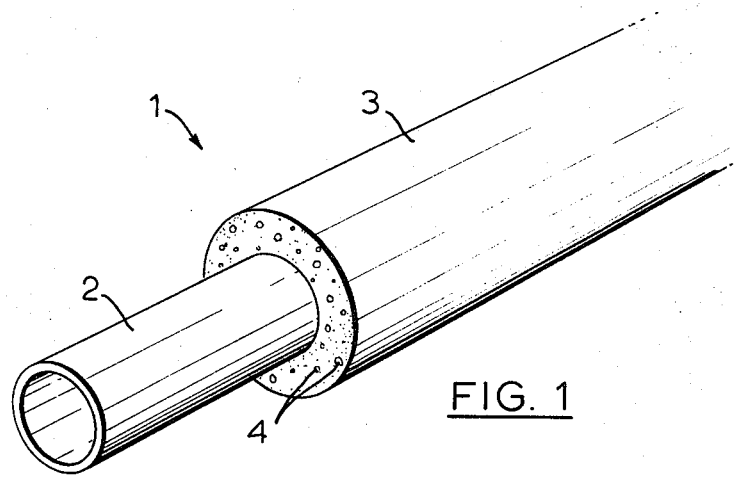
FIG. 1 is a perspective view of one end of a length of insulated pipe.

In FIG. 1 the insulated pipe shown generally as 1 has an exposed end 2 suitable for connecting to a similar pipe fitting, and an insulated coating 3. The coating material is cellular to a considerable extent and an example of a cell is indicated at 4.

Figure 2:
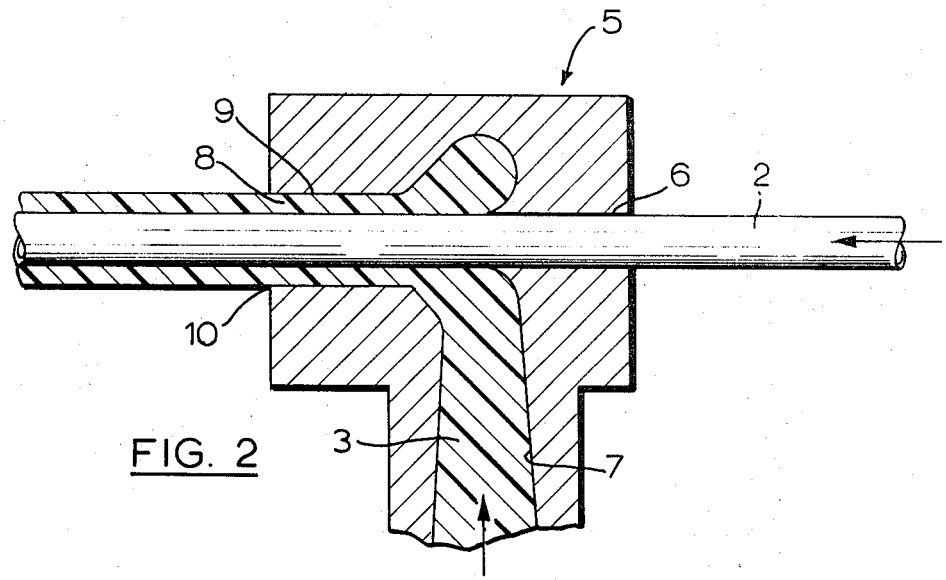
FIG. 2 is a cross-sectional side view in partially diagramatic form of an apparatus for extruding insulated tubing.

In FIG. 2 an extrusion die 5 is shown in cross-section. The die is heated by a heating means (not shown) to heat the thermoplastic material to extrusion temperature. The die has a passage 6 throughout for passing metal tubing 2 through the die. Thermoplastic material 3 is fed perpendicular to the metal tubing through thermoplastic feed passage 7. The thermoplastic material fills the die discharge passage 8 defined by the space formed between tubing 2 and the inner walls 9 of die 5. This thermoplastic material consists of ethylene/vinyl acetate copolymer having approximately 50 percent by weight of asbestos fibers based on the weight of the thermoplastic material and 0.5 percent by weight of a blowing agent.

Tubing 2 and thermoplastic material 7 are extruded through die head 10. The thermosplastic material is quickly cooled and the resulting product is a pipe having a thermoplastic material extruded thereon. In view of the composition of the thermoplastic material the coated pipe was found to have good thermally insulating characteristics.

I claim:

1. An article of manufacture comprising metal tubing having a thermal insulating material extruded thereon, said insulating material having a density of from 0.400 gm./cc. to 0.800 gm./cc. and comprising an expanded cellular thermoplastic selected from the group consisting of polyethylene and ethylene/vinyl acetate copolymer uniformly impregnated with asbestos fibers.

2. An article as claimed in claim 1 wherein the asbestos fibers constitute from 20 percent to 90 percent by weight of said insulating material.

3. An article as claimed in claim 1 wherein the asbestos fibers constitute from 30 percent to 70 percent by weight of said insulating material.

4. An article as claimed in claim 3 wherein said cellular thermoplastic is ethylene/vinyl acetate copolymer having a melt index above 200 g./10 minutes and containing a blowing agent in an amount of from 0.5 percent to 2.0 percent by weight of said copolymer.

5. An article as claimed in claim 3 wherein said cellular thermoplastic is polyethylene having a density of from 0.9100 to 0.9700 g./cc. and containing a blowing agent in sufficient amount to reduce the density of said polyethylene to a range of from 0.400 to 0.800 g./cc.

6. An article as claimed in claim 5 wherein said cellular thermoplastic is uniformly impregnated with asbestos fibers in an amount of from 20 percent to 70 percent by weight based on the weight of said insulating material.

7. An article as claimed in claim 1 wherein said insulating material contains a pigment.

References Cited

UNITED STATES PATENTS

| 2,848,739 | 8/1958 | Henning | 264—47 XR |
| 2,885,738 | 5/1959 | Henning | 264—47 |
| 2,994,327 | 8/1961 | Otto et al. | |
| 3,068,532 | 12/1962 | Higgins | 264—47 XR |
| 3,214,234 | 10/1965 | Bottomley | 264—54 XR |

EDGAR W. GEOGHEGAN, Primary Examiner

U.S. Cl. X.R.

264—47